US006643764B1

(12) United States Patent
Thorson et al.

(10) Patent No.: US 6,643,764 B1
(45) Date of Patent: Nov. 4, 2003

(54) MULTIPROCESSOR SYSTEM UTILIZING MULTIPLE LINKS TO IMPROVE POINT TO POINT BANDWIDTH

(75) Inventors: Gregory M. Thorson, Altoona, WI (US); Steven Scott, Eau Claire, WI (US); Ram Gupta, Morgan Hill, CA (US); William A. Huffman, Los Gatos, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 487 days.

(21) Appl. No.: 09/620,372

(22) Filed: Jul. 20, 2000

(51) Int. Cl.[7] .............................................. G06F 15/163
(52) U.S. Cl. ......................................... 712/11; 712/225
(58) Field of Search ............................. 712/11, 10, 13, 712/225

(56) References Cited

U.S. PATENT DOCUMENTS

| | | | |
|---|---|---|---|
| 5,530,809 A | * | 6/1996 | Douglas et al. ............. 709/250 |
| 5,859,981 A | * | 1/1999 | Levin et al. ................ 709/238 |
| 5,878,241 A | | 3/1999 | Wilkinson et al. .......... 395/379 |
| 6,092,174 A | * | 7/2000 | Roussakov ................... 712/15 |

FOREIGN PATENT DOCUMENTS

| | | | | |
|---|---|---|---|---|
| WO | | 99/26429 | 5/1999 | ............ H04Q/3/00 |

OTHER PUBLICATIONS

Nishi, H., et al., "The JUMP–1 Router Chip: A versatile router for supporting a distributed shared memory", *Proceedings of the 1996 IEEE 15th Annual Int'l Phoenix Conference on Computers & Communications, Conf. 15, XP000594785*, pp. 158–164. (Mar. 1996).

* cited by examiner

*Primary Examiner*—Eric Coleman
(74) *Attorney, Agent, or Firm*—Schwegman, Lundberg, Woessner & Kluth, P.A.

(57) ABSTRACT

A multiprocessor computer system comprises a plurality of processing element nodes and an interconnect network interconnecting the plurality of processing element nodes. An interface circuit is associated with each one of the plurality of processing element nodes. The interface circuit has a lookup table having n-number of routing entries for a given destination node. Each one of the n-number of routing entries associated with a different class of traffic. The network traffic is routed according to the class.

17 Claims, 6 Drawing Sheets

MULTIPROCESSOR SYSTEM UTILIZING MULTIPLE LINKS TO IMPROVE POINT TO POINT BANDWIDTH

FIELD OF THE INVENTION

The present invention relates generally to the field of high-speed digital data processing systems, and more particularly, to routing messages on multiple links in multiprocessor computer systems.

BACKGROUND OF THE INVENTION

Multiprocessor computer systems comprise a number of processing element nodes connected together by an interconnect network. Each processing element node includes at least one processing element. The interconnect network transmits packets of information or messages between processing element nodes. Multiprocessor computer systems having up to hundreds or thousands of processing element nodes are typically referred to as massively parallel processing (MPP) systems. In a typical multiprocessor MPP system, every processing element can directly address all of memory, including the memory of another (remote) processing element, without involving the processor at that processing element. Instead of treating processing element-to-remote-memory communications as an I/O operation, reads or writes to another processing element's memory are accomplished in the same manner as reads or writes to the local memory. In such multiprocessor MPP systems, the infrastructure that supports communications among the various processors greatly affects the performance of the MPP system because of the level of communications required among processors.

One way the infrastructure affects the performance of an MPP system is in the amount of bandwidth the infrastructure provides. Bandwidth is the maximum amount of data that can be sent through a network connection at a given time. Bandwidth is typically measured in bits per second (bps). The bandwidth available in current MPP systems often limits the performance of the MPP system.

Another way the infrastructure affects the performance of an MPP system is in the level of fault tolerance provided by the infrastructure. For example, if a segment of the communications path fails, the MPP is unable to continue normal operation unless an alternate or redundant path is provided. However, redundant paths are difficult to compute (often requiring complicated calculations). Further more, switching traffic to the redundant path is often difficult.

For these and other reasons, there is a need for a multiprocessor system with an improved infrastructure.

SUMMARY OF THE INVENTION

The present invention provides a multiprocessor computer system having a plurality of processing element nodes and an interconnect network interconnecting the plurality of processing element nodes. An interface circuit is associated with each one of the plurality of processing element nodes. The interface circuit has a lookup table having n-number of routing entries for a given destination node. Each one of the n-number of routing entries associated with a different class of traffic.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
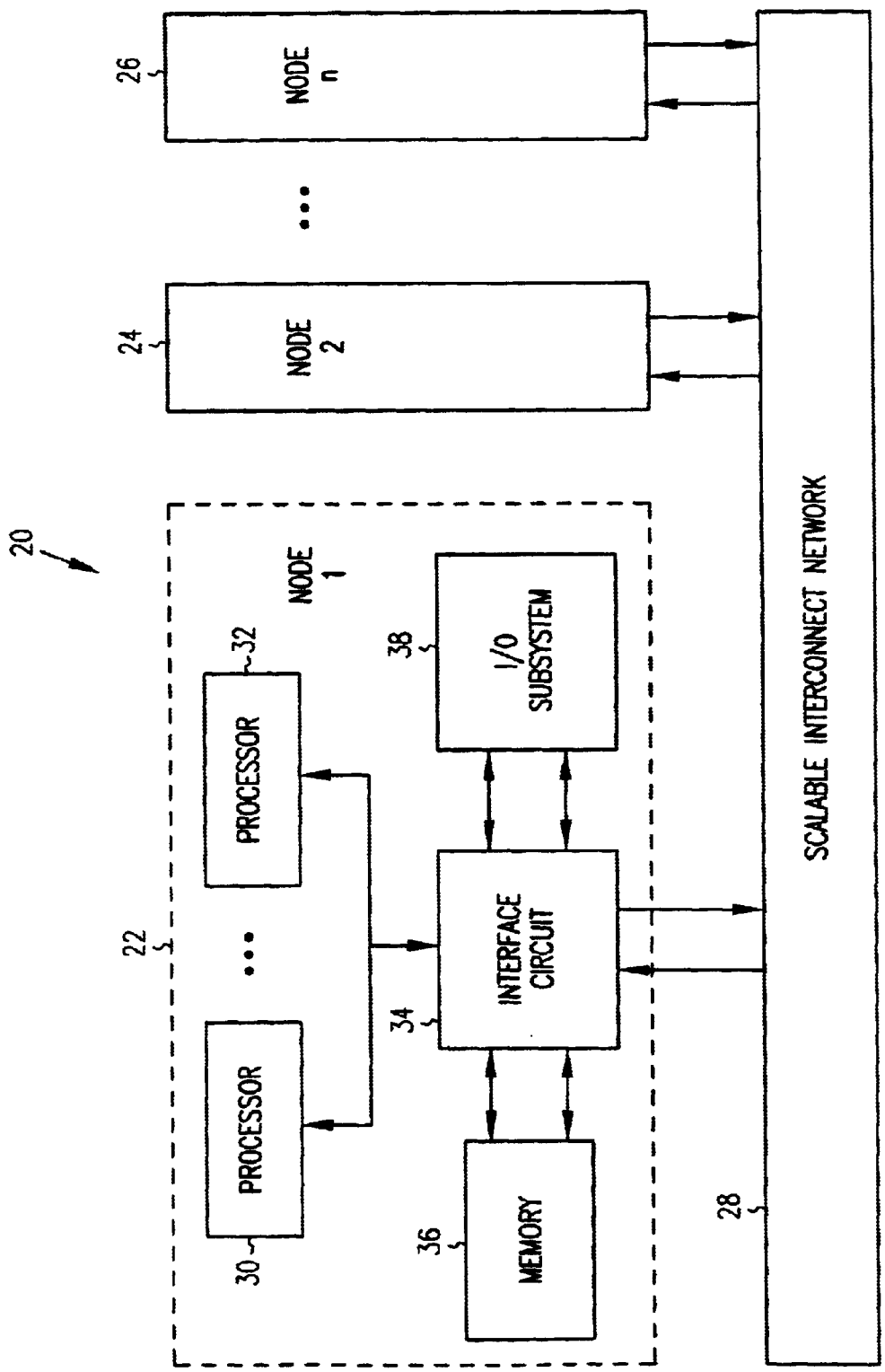
FIG. 1 is block diagram of a multiprocessor computer system.

A representative multiprocessor computer system according to the present invention is indicated generally at 20 in FIG. 1. As indicated in FIG. 1, multiprocessor computer system 20 includes up to n nodes, such as indicated by a first node 22, a second node 24, and an nth node 26. The nodes are interconnected by a scalable interconnect network 28, which permits multiprocessor computer systems 20 to be scaled from desk side systems to very large supercomputer configurations.

As illustrated in detail for first node 22, each node in multiprocessor computer system 20 includes at least one processor, such as a first processor 30 and a second processor 32 for node 22. An interface circuit 34 interfaces with scalable interconnect network 28 and communicates with a memory 36 and an input/output subsystem 38.

Although the multiprocessor computer system 20 illustrated in FIG. 1 provides one example environment to implement embodiments of the present invention, the present invention is in no way limited to this particular application environment. In fact, many alternative environments using alternative node and interface circuit configurations can be utilized. To a large extent, embodiments of the present invention are independent of the complexity of the nodes, such as nodes 22, 24, and 26, interconnected by that topology.

Figure 2:
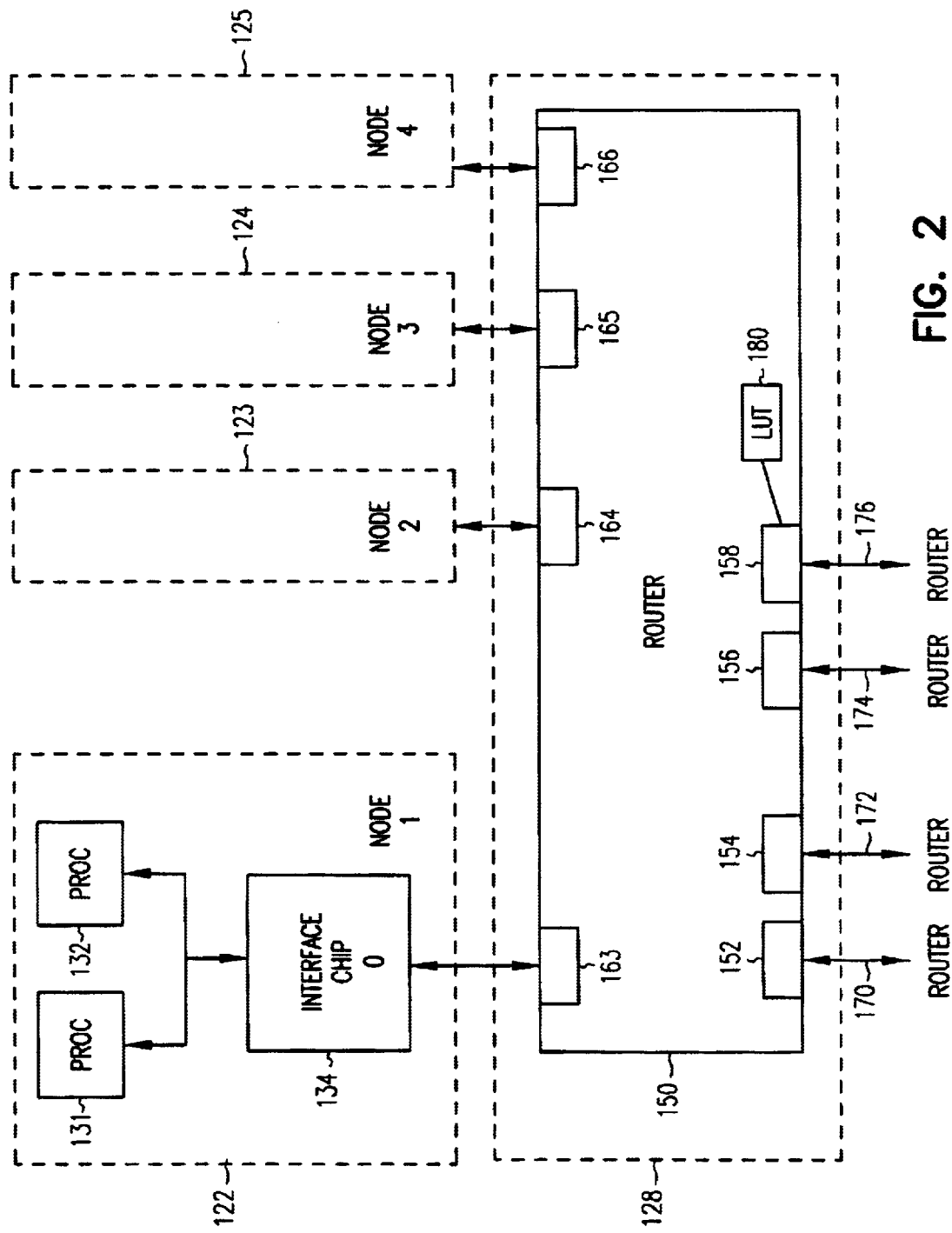
FIG. 2 is a block diagram of one embodiment of the interface between a scalable interconnect network and four processing element nodes.

FIG. 2 illustrates, in block diagram form, one embodiment of the interface between a scalable interconnect network 128 and four nodes 122, 123, 124, and 125. In this embodiment, scalable interconnect network 128 includes one or more routers, such as the example router 150 shown in FIG. 2. Router port 163 communicates with a first node 122. As shown in the expanded view of the first node 122, router port 163 communicates with the first node 122 via interface chip 134. In the first node 122, interface chip 134 communicates with processors 131, and 132. Similarly, router port 164 communicates with a second node 123, router port 165 communicates with a third node 124, and router port 166 communicates with a fourth node 125. Router ports 152, 154, 156, and 158 communicate with other routers in the scalable interconnect network 128 as further described below. In the example embodiment illustrated in FIG. 2, one router 150 communicates directly with up to eight processors and up to four other routers in the scalable interconnect network 128. In one embodiment, router 150 includes a lookup table 180 (only pictured with router port 158 for simplicity) associated with each one of the router ports 152, 154, 156, 158, 163, 164, 165, and 166. The lookup table associated with each one of the ports holds entries having directions for routing from a next router along a given route. Each lookup table includes n-number of routing entries for a given destination node and each one of the n-number of routing entries associated with a different class of traffic.

Figure 3:
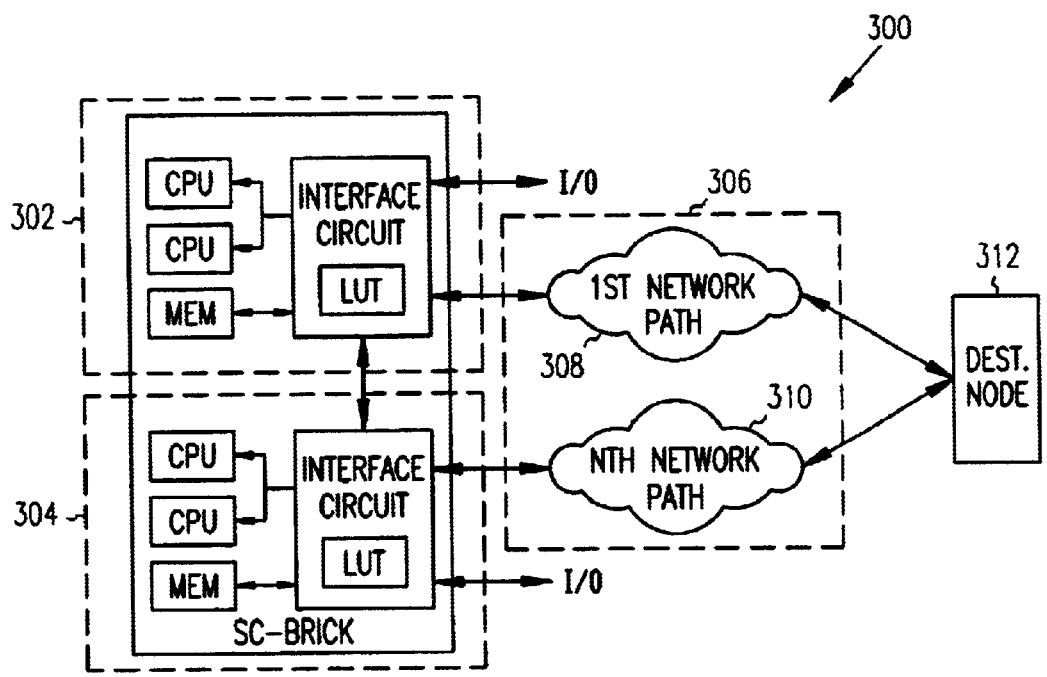
FIG. 3 is a block diagram of one embodiment of a portion of a multiprocessor system capable of separating traffic into classes and routing traffic by the classes.

FIG. 3 illustrates, in block diagram form, one embodiment of a portion of a multiprocessor system 300 capable of separating traffic into classes and routing traffic by the classes. The example embodiment of a multiprocessor computer system shown in FIG. 3 comprises one or more processing element nodes 302, 304 and an interconnect network 306 interconnecting the plurality of processing element nodes. Each one of the processing element nodes has an interface circuit. The interface circuit has a lookup table having n-number of routing entries for a given destination node such as destination node 312 shown in FIG. 3. Each one of the n-number of routing entries is associated with a different class of traffic. Packets are routed across physical communication links of the interconnect network based on the class of the packet.

A multiprocessing system according to embodiments of the present invention separates network traffic into classes and routes the traffic according to the class. In one embodiment, each class of network traffic is routed on a different path through interconnect network 306. In another embodiment, each class of network is routed on the same path. In still another embodiment, some classes of network traffic are routed on different paths while other classes are routed on the same path. In still another embodiment, the network is configured as one or more planes and different classes of traffic are routed on different planes. As used herein, a "plane" refers to a predetermined set of routers and physical communications links along a path from a source node to a destination node. In the example embodiment shown in FIG. 3, the source node is one of the processing element nodes 302, 304 and the destination node is block 312.

The interface circuit for each one of the processing element nodes 302, 304 includes a routing lookup table (LUT) at each input port. For simplicity, only a single LUT table is shown in each interface circuit; however, in some embodiments a separate LUT is associated with each input port. In the example embodiment shown in FIG. 3, a LUT is associated (although not shown) with each of the input ports including a processor interface port, a memory interface port, an I/O interface port, and two network interface ports. The first network interface port is for the network path directly connected to the interface circuit. The second network interface port is connected to the interface circuit in the adjacent processing element node which is connected to the second network path.

In one embodiment, the interface circuit splits the network traffic from the processor interface and the memory interface into two classes. In an example embodiment, these classes are based upon a low order bit of a cache line addresses, but in alternate embodiments the classes use other distinctions. For example, the class may be based on any odd/even bit of a destination address. In other words, if the bit used to determine the class is odd, then the traffic is in a first class. If the bit used to determine the class is even, then the traffic is in a second class.

In operation, a method of routing packets in multiprocessor system comprises identifying a class for a packet. The class of the packet is used to determine a route for the packet from at least two route entries for a destination in a router table. The packet is then routed along a path determined from the router table based on the class. For an example embodiment in which network traffic is divided into two classes, a first class of traffic to the destination node 312 is routed on the first network path 308. A second class of traffic to the destination node 312 is routed on the second network path 310.

Figure 4:
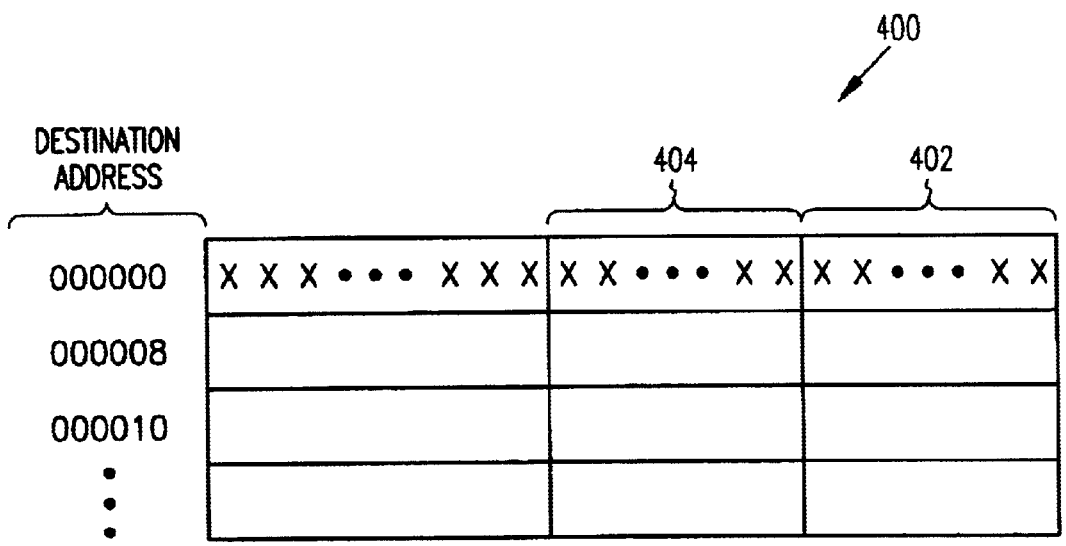
FIG. 4 is an example embodiment of a lookup table used to route classes of traffic through a interconnect network.

FIG. 4 is an example embodiment of a lookup table 400 used to send different classes of traffic on separate paths through the network if so desired. The fields in the lower bits 402 of a register in the look up table for a particular destination may be programmed for a first class of traffic. The fields in the upper bits 404 of the register in the look up table for the same destination may be programmed for a second class traffic. The remaining bits in the register for each destination address represent additional routing information such as a direction and the like. If multiple network paths are not desired for the two classes of traffic, the sets of fields (entries in the look up table) for each class of traffic may be programmed with the same values. The fields in the look up table determine which port the traffic will leave the chip through as well as routing information for the downstream router. A look up table according to the present invention is not limited to separating network traffic into two classes. The look up table may include n-routing entries where n is equal to the number of classes of traffic.

Figure 5:
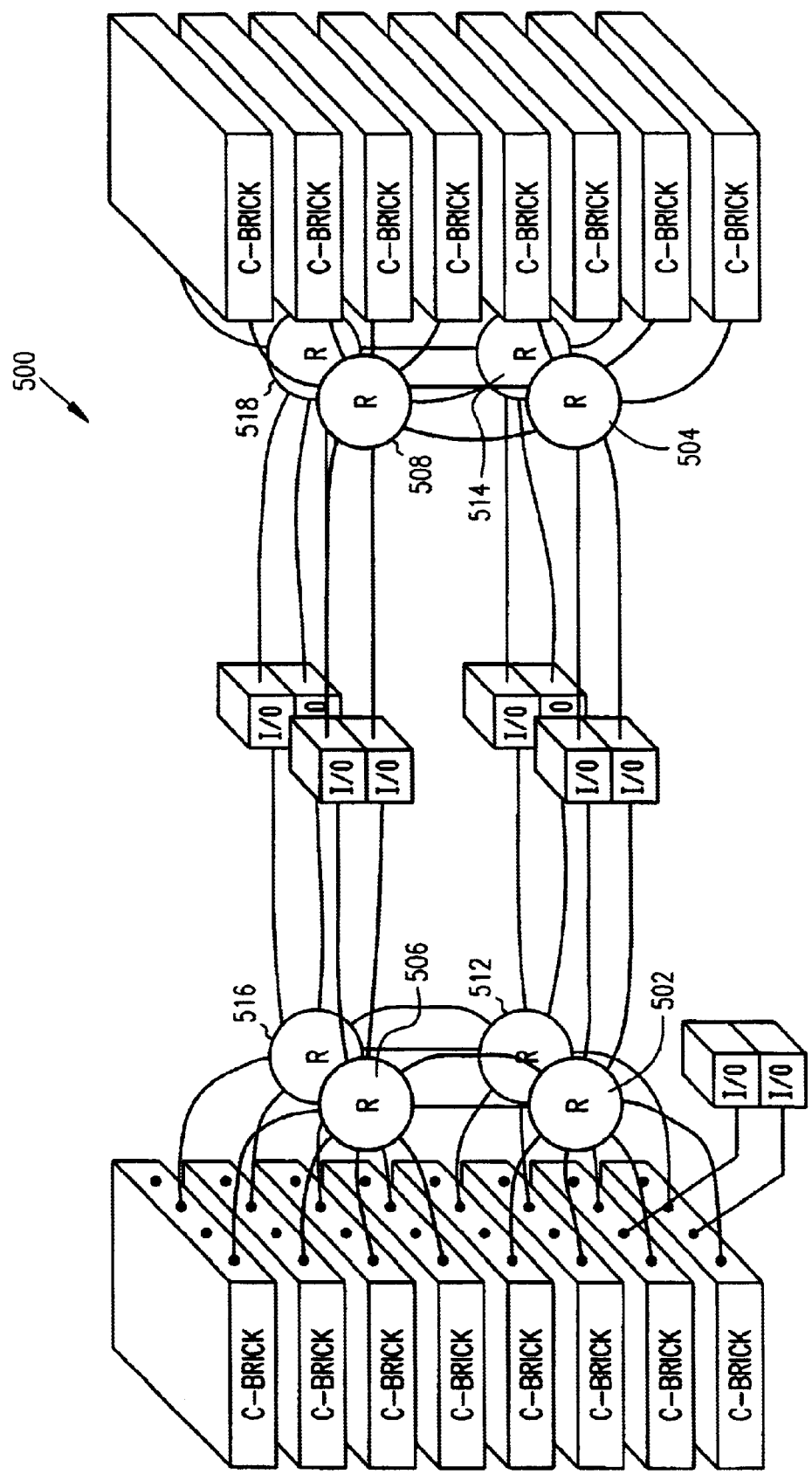
FIGS. 5, 6, and 7 are example embodiments of multiprocessing systems having two or more planes for routing traffic of different classes.
Figure 6:
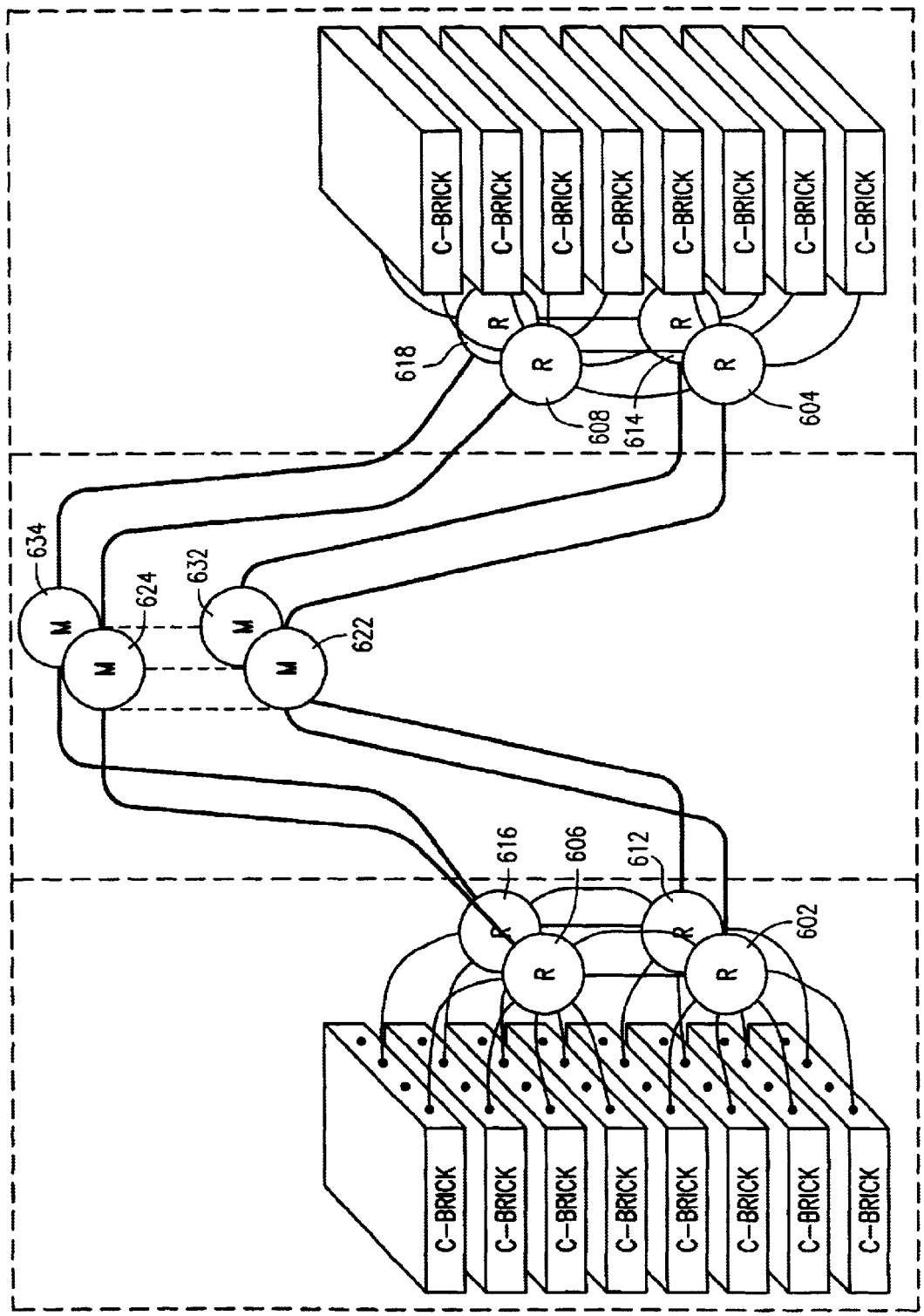
Figure 7:
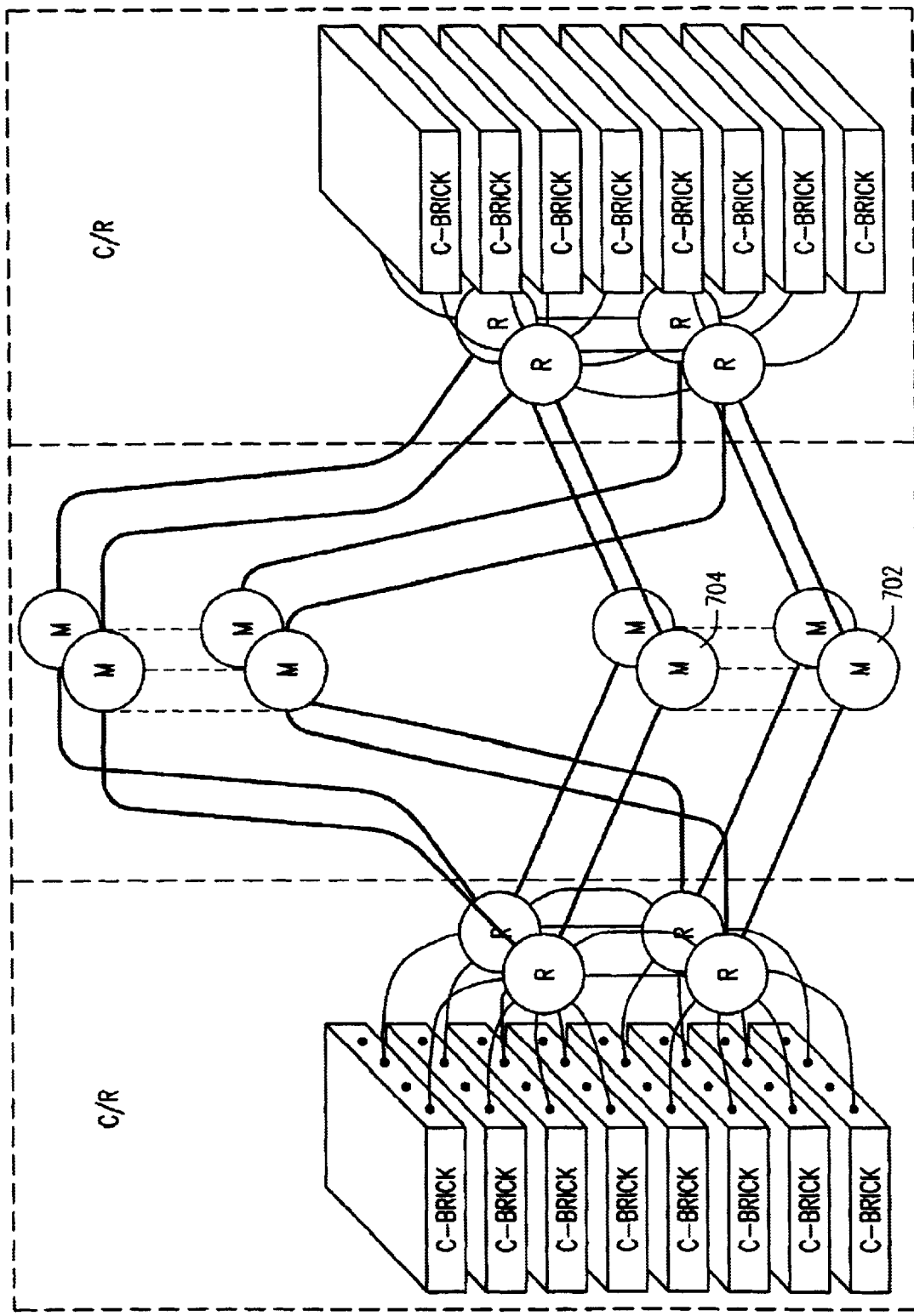

FIGS. 5, 6, and 7 are example embodiments of multiprocessing systems having two or more planes for routing traffic of different classes. The routers and meta-routers shown in FIGS. 5, 6, and 7 comprise routing look up tables such as the look up table shown in FIG. 4. These look up tables have two or more routing entries for a given destination. Each one of the routing entries is associated with a class of traffic. In one embodiment, each class of traffic is routed on a different plane.

In the example multiprocessor computing system 500 shown in FIG. 5, each computation brick (labeled "c-brick") comprises two processing element nodes. Each processing element node comprises two processors and an interface circuit to send and receive messages between the processors and the interconnect network. Thus the multiprocessor system shown in FIG. 5 includes thirty-two processing element nodes (and thus sixty-four processors) interconnected by an interconnect network. The interconnect network is configured as two planes. Each plane comprises four routers. A first plane is comprised of a routers 502, 504, 506, and 508, and the physical communications links that interconnect the routers 502, 504, 506 and 508. A second plane is comprised of a routers 512, 514, 516, and 518, and the physical communications links that interconnect the routers 512, 514, 516, and 518. In the example embodiment shown in FIG. 5, the routers in the network are quad bristled. In other words, the routers in the network are connect to four processing element nodes. Thus, a thirty-node system as shown in FIG. 5 has four routers in a plane. Likewise, a two hundred fifty six node system has thirty two routers in each plane with additional meta-routers and so on for multiprocessor systems with even more processing element nodes.

FIGS. 6 and 7 are block diagrams of alternate embodiments of a multiprocessor computer system. The multiprocessor computer systems shown in FIGS. 6 and 7 comprise a plurality of processors and a first set of routers for interconnecting the plurality of processors. The first set of routers are indicated with the letter "R" in a circle. FIGS. 6 and 7 also includes a second set of routers for interconnecting the first set of routers. The second set of routers are referred to herein as meta-routers and are indicated by the letter "M" in a circle. Both the first set of routers and the second set of routers comprise a lookup table having n-number of routing entries for a given destination. Each one of the n-number of routing entries is associated with a different class of traffic. In one embodiment, each class of traffic is routed on a different plane.

In the example embodiment shown in FIG. 6, each computation brick (labeled "c-brick") again comprises two processing element nodes. Like the multiprocessor system shown in FIG. 5, the example embodiment shown in FIG. 6 includes thirty-two processing element nodes (and thus sixty-four processors) interconnected by an interconnect network. The interconnect network shown in FIG. 6 comprises two router planes and two meta-router planes. Each router plane comprises four routers. A first router plane is comprised of a routers 602, 604, 606, and 608, and the physical communications links that interconnect the routers 602, 604, 606 and 608. A second router plane is comprised of a routers 612, 614, 616, and 618, and the physical communications links that interconnect the routers 612, 614, 616, and 618. Each meta-router plane comprises two routers. A first meta-router plane comprises meta-routers 622 and 624. A second meta-router plane comprises 632 and 634.

FIG. 7 is an alternate embodiment of the multiprocessor system shown in FIG. 6. FIG. 7 comprises two router planes and four meta-router planes. The two router planes are configured that same as the router planes shown in FIG. 6. The each meta-router plane comprises two routers. A first meta-router plane comprises meta-routers 702 and 704. A second meta-router plane comprises 706 and 708. A third meta-router plane comprises meta-routers 712 and 714. A fourth meta-router plane comprises meta-routers 716 and 718. In the example embodiment shown in FIG. 7, each router has eight ports and can support dual meta-planes for each main network plane. Thus, a two network plane system with four meta planes is possible by doubling the number of meta-router chips as shown in FIG. 7.

The example embodiments shown in FIGS. 5, 6, and 7 are for illustrative purposes only. The invention is not limited to these example embodiments. For example, systems having more than thirty processing nodes are contemplated. Examples of such systems are shown in U.S. patent application Ser. No. 09/408972 filed on Sep. 29, 1999 entitled "Network Topology for a Scalable Multiprocessor System" which is assigned to the assignee of the present invention and which is herein incorporated by reference. In still another embodiment, a routerless system with a single network ring is possible in systems having up to eight compute nodes. In such a routerless system, the lookup tables of the present invention are incorporated in the interface circuitry for each compute node.

A multiprocessor system utilizing multiple physical communication links to route multiple classes of traffic to a same destination is described. The multiprocessor system increases network bandwidth by routing traffic to the same destination on the different network communication links. Thus, in a system having n classes of traffic, the network bandwidth may be increased as much as n times the bandwidth of a single communication channel. The multiprocessor system utilizes multiple routing entries in a routing look up table. The sub-entries are selected by various criteria. Additionally, the multiprocessor system of the present invention provides redundant paths. If a comminations link fails along the path for one class of traffic, that class of traffic may easily be routed along the path for another class of traffic. No complicated calculations are needed for change in paths. Rather, the routing look up tables are set so that the class of traffic originally routed on the failed path is instead routed on an non-failed path.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A multiprocessor computer system comprising:
    a plurality of processing element nodes;
    an interconnect network interconnecting the plurality of processing element nodes;
    an interface circuit associated with each one of the plurality of processing element nodes, the interface circuit having a lookup table having n-number of routing entries for a given destination node, each one of the n-number of routing entries associated with a different class of traffic.

2. The multiprocessor computer system of claim 1 further comprising routers for routing messages between the plurality of processing element nodes on the interconnect network, each router including:
    ports for receiving and sending messages, and
    the lookup tables associated to ports and holding entries having directions for routing from a next router along a given route, each lookup table including n-number of routing entries for a given destination node, each one of the n-number of routing entries associated with a different class of traffic.

3. The multiprocessor computer system of claim 1 wherein the different class of traffic is indicated by a bit in a destination address.

4. The multiprocessor computer system of claim 3 wherein the bit is a low order bit of a cache line address.

5. The multiprocessor computer system of claim 3 wherein a zero in the bit indicates a first class of traffic and a one in the bit indicates a second class of traffic.

6. The multiprocessor computer system of claim 4 wherein the network is configured as one or more planes and one of the different classes of traffic are routed on one of the planes.

7. The multiprocessor computer system of claim 1 wherein each one of the processing element nodes comprises two processors.

8. A method of routing packets in multiprocessor system, the method comprising:
    identifying a class for a packet from two or more classes; and
    using the class of the packet to determine a route for the packet from n-number of routing entries for a destination in a router lookup table wherein n is equal to the number of classes; and routing the packet along a path determined from the router table based on the class.

9. The method of routing packets in claim 8 wherein at least two of the routing entries are the same.

10. The method of claim 8 wherein the low order bit of a cache line address is used to identify the class.

11. The method of claim 8 wherein routes for the classes of packets increase the bandwidth of the multiprocessor system by n-times.

12. The method of claim 8 wherein upon a failure of a communications link along a path, routing the packet along the path for a different class of packets.

13. The method of claim 8 further comprising identifying ordered packets and routing the ordered packets as the same class of traffic.

14. A multiprocessor computer system comprising:

a plurality of processors;

a first set of routers for interconnecting the plurality of processors; and a second set of routers for interconnecting the first set of routers wherein the first set of routers and the second set of routers comprise a routing lookup table having n-number of routing entries for a given destination, each one of the n-number of routing entries associated with a different class of traffic.

15. The multiprocessor computer system of claim 14 wherein the different class of traffic is indicated by a bit in a destination address.

16. The multiprocessor computer system of claim 15 wherein the bit is a low order bit of a cache line address.

17. The multiprocessor computer system of claim 16 wherein a zero in the bit indicates a first class of traffic and a one in the bit indicates a second class of traffic.

* * * * *